US012749699B2

(12) United States Patent
Fang et al.

(10) Patent No.: US 12,749,699 B2
(45) Date of Patent: Sep. 29, 2026

(54) PRESSURE BONDING DEVICE

(71) Applicant: Microvast, Inc., Stafford, TX (US)

(72) Inventors: Weifeng Fang, Huzhou (CN); Wenjuan Liu Mattis, Longwood, FL (US)

(73) Assignee: MICROVAST, INC., Stafford, TX (US)

( * ) Notice: Subject to any disclaimer, the term of this patent is extended or adjusted under 35 U.S.C. 154(b) by 77 days.

(21) Appl. No.: 18/937,055

(22) Filed: Nov. 5, 2024

(65) Prior Publication Data

US 2026/0128355 A1 May 7, 2026

(51) Int. Cl.
*H01M 10/04* (2006.01)

(52) U.S. Cl.
CPC ................................ *H01M 10/0468* (2013.01)

(58) Field of Classification Search
CPC ........... H01M 10/058; H01M 2220/20; H01M 10/0525; H01M 10/052; H01M 4/625; H01M 4/364; H01M 10/0468
See application file for complete search history.

(56) References Cited

U.S. PATENT DOCUMENTS

| | | | | |
|---|---|---|---|---|
| 2007/0035070 A1* | 2/2007 | Jiang | B29C 63/16 | |
| | | | 425/389 | |
| 2022/0363021 A1* | 11/2022 | Koffers | B29C 70/44 | |

FOREIGN PATENT DOCUMENTS

| | | |
|---|---|---|
| CN | 112208109 A | 1/2021 |
| CN | 113748554 A | 12/2021 |
| CN | 217983452 U | 12/2022 |

OTHER PUBLICATIONS

Machine translation of CN107845766A (Year: 2024).*
Machine translation of CN107863559 A (Year: 2018).*
Machine translation of CN 217983452U (Year: 2022).*

* cited by examiner

*Primary Examiner* — Vishal I Patel
(74) *Attorney, Agent, or Firm* — Andrew C. Cheng

(57) ABSTRACT

The present invention provides a pressure bonding device including a base, a sealing cover, and a pressurizing assembly. The base is used to place a to-be-pressed member; the sealing cover is used to cooperate with the base to form a sealing space between the base and the sealing cover during pressure bonding operation; the pressurizing assembly is connected to the sealing cover, and the pressurizing assembly is used to apply pressure to a flexible medium in the sealing space to cause the to-be-pressed member to be pressed under the pressure of the flexible medium. The pressure bonding device can uniformly apply pressure to various positions of the to-be-pressed member, ensuring the uniformity of applying pressure on the to-be-pressed member and improving the pressure bonding effect and the performance of the battery.

17 Claims, 10 Drawing Sheets

PRESSURE BONDING DEVICE

TECHNICAL FIELD

This invention relates to the field of battery manufacturing technology, and in particular to a pressure bonding device.

BACKGROUND

In the manufacturing process of batteries, it is usually necessary to apply pressure to some members, such as pressure bonding a lithium foil onto the surface of a member of a battery cell, or pressure bonding the electrode plate and the separator inside a battery cell, or pressure bonding the electrode tabs of multiple battery cells to achieve electrical connection between the battery cells.

At present, flat hot pressing or rolling pressing is generally used to press the to-be-pressed member. Taking flat hot pressing as an example, the to-be-pressed member is placed between two flat hot pressing blocks in a hot press machine, and a certain pressure and temperature are provided by the hot pressing blocks to perform hot pressing on the to-be-pressed member, thereby achieving the function of pressure bonding.

SUMMARY

Due to the possibility that the surface of the to-be-pressed member may not have a flat structure (for example, the to-be-pressed member has local bending or height differences), in this case, the flat hot pressing or rolling pressing methods cannot guarantee the uniformity of pressure bonding at various positions of the to-be-pressed member, thereby affecting the pressure bonding effect and the performance of the battery assembled by the battery cells.

The object of the present invention is to provide a pressure bonding device that can uniformly apply pressure to various positions of a to-be-pressed member, ensuring the uniformity of the pressure on the to-be-pressed member, and improving the pressure bonding effect and the performance of the battery.

An embodiment of the present invention provides a pressure bonding device including a base, a sealing cover, and a pressurizing assembly, wherein the base is configured to place a to-be-pressed member; the sealing cover is configured to cooperate with the base to form a sealing space between the base and the sealing cover during pressure bonding operation; the pressurizing assembly is connected to the sealing cover, and the pressurizing assembly is configured to apply pressure to a flexible medium in the sealing space to cause the to-be-pressed member to be pressed under the pressure of the flexible medium.

In an achievable manner, the flexible medium includes gas located in the sealing space, and the pressurizing assembly is configured to pressurize the gas in the sealing space to form high-pressure gas to apply pressure to the to-be-pressed member through the high-pressure gas;

and/or, the flexible medium includes a flexible pressing member provided in the sealing space, and the pressurizing assembly is configured to compress the flexible pressing member to apply pressure to the to-be-pressed member through the flexible pressing member.

In an achievable manner, the flexible pressing member includes a fluid bladder and/or a flexible film.

In an achievable manner, the pressurizing assembly includes a piston, the piston is located within the sealing cover and is slidably sealed with an inner wall of the sealing cover, and the sealing space is formed between the sealing cover, the piston and the base; the piston can apply pressure to the flexible medium in the sealing space when moving towards the base.

In an achievable manner, the pressurizing assembly further includes a piston rod and a driving device, the driving device is located outside the sealing cover, one end of the piston rod is connected to the driving device, and the other end of the piston rod passes through the sealing cover and is connected to the piston; the driving device is configured to drive the piston to move towards or away from the base within the sealing cover.

In an achievable manner, the driving device is connected to the sealing cover, and the driving device is further configured to drive the sealing cover to move towards or away from the base.

In an achievable manner, a hollow cavity communicated with the sealing space is provided inside the piston rod, and a pressure detection device is provided in the hollow cavity for detecting the pressure in the sealing space.

In an achievable manner, the pressure bonding device further includes a support frame, the support frame includes a support plate, a guide plate, and several first guide shafts, the driving device is fixed on the support plate; the guide plate is located between the support plate and the sealing cover, one end of each first guide shaft is fixedly connected to the support plate, the guide plate is slidably connected to each first guide shaft; the driving device is connected to the guide plate, and one end of the piston rod is connected to the guide plate; the driving device is configured to drive the guide plate to move along an axial direction of the first guide shaft.

In an achievable manner, the pressure bonding device further includes a worktable, the base is arranged on the worktable; the other end of each first guide shaft is fixedly connected to the worktable.

In an achievable manner, several linear bearings are provided on the guide plate, and the linear bearings are respectively sleeved on the first guide shafts.

In an achievable manner, the driving device is connected to the guide plate through a floating joint.

In an achievable manner, the support frame further includes several second guide shafts, one end of each second guide shaft is fixedly connected to the sealing cover, and the other end of each second guide shaft is slidably connected to the guide plate; each second guide shaft is sleeved with an elastic member, and two opposite ends of the elastic member respectively abut against the guide plate and the sealing cover.

In an achievable manner, the base includes a support seat for placing the to-be-pressed member, and an opening is provided on one end of the sealing cover nearing the support seat; during pressure bonding operation, the open end of the sealing cover abuts against the support seat, and the sealing space is formed between the sealing cover and the support seat.

In an achievable manner, the support seat is provided with several exhaust holes, and the exhaust holes penetrate the support seat; during pressure bonding operation, the gas between the to-be-pressed member and the support seat can be discharged through the exhaust holes.

In an achievable manner, the base further includes a flexible sealing member, the flexible sealing member is covered on the support seat, and the flexible sealing member covers the to-be-pressed member and the exhaust holes.

In an achievable manner, the base further includes an annular limiting member, the annular limiting member is covered at an edge portion of the flexible sealing member, and the annular limiting member is fixedly connected to the support seat.

In an achievable manner, a second sealing ring is provided on a top surface of the support seat, the second sealing ring is arranged around a periphery of the to-be-pressed member, and the second sealing ring is located between the flexible sealing member and the support seat.

In an achievable manner, the support seat includes a bottom plate and a protrusion connected to the bottom plate, the protrusion protrudes towards the sealing cover, the protrusion is configured to place the to-be-pressed member, the exhaust holes are provided on the protrusion; during pressure bonding operation, the sealing cover covers the protrusion, the open end of the sealing cover abuts against the bottom plate, and the sealing space is formed between the sealing cover and the protrusion.

In an achievable manner, a third sealing ring is provided on an outer peripheral surface of the protrusion, and the third sealing ring is sandwiched between the outer peripheral surface of the protrusion and an inner wall of the sealing cover.

In an achievable manner, the pressure bonding device further includes a heating assembly for heating the base.

In an achievable manner, the heating assembly includes a heat insulation member and a heating member, the heat insulation member is disposed below the base, and the heating member is disposed between the heat insulation member and the base.

In an achievable manner, a bottom wall of the base is provided with a groove, and the heating member is arranged in the groove.

In an achievable manner, a pole is provided on the heat insulation member, the pole protrudes from the heat insulation member towards the base, and the pole extends into the groove; a temperature detection device is provided inside the pole, and the temperature detection device is configured to detect a heating temperature of the base.

The pressure bonding device provided in the present invention includes a base, a sealing cover, and a pressurizing assembly. During pressure bonding operation, the sealing cover and the base cooperate with each other to form a sealing space, and the pressurizing assembly is used to apply pressure to a flexible medium in the sealing space, thereby indirectly pressing the to-be-pressed member. Due to the ability of the flexible medium to uniformly apply pressure to various positions of the to-be-pressed member, compared to traditional flat hot pressing or rolling pressing methods, this method of using the flexible medium to apply pressure to the to-be-pressed member can ensure the uniformity of applying pressure, thus improving the pressure bonding effect and accordingly enhancing the performance of the battery.

Figure 1:
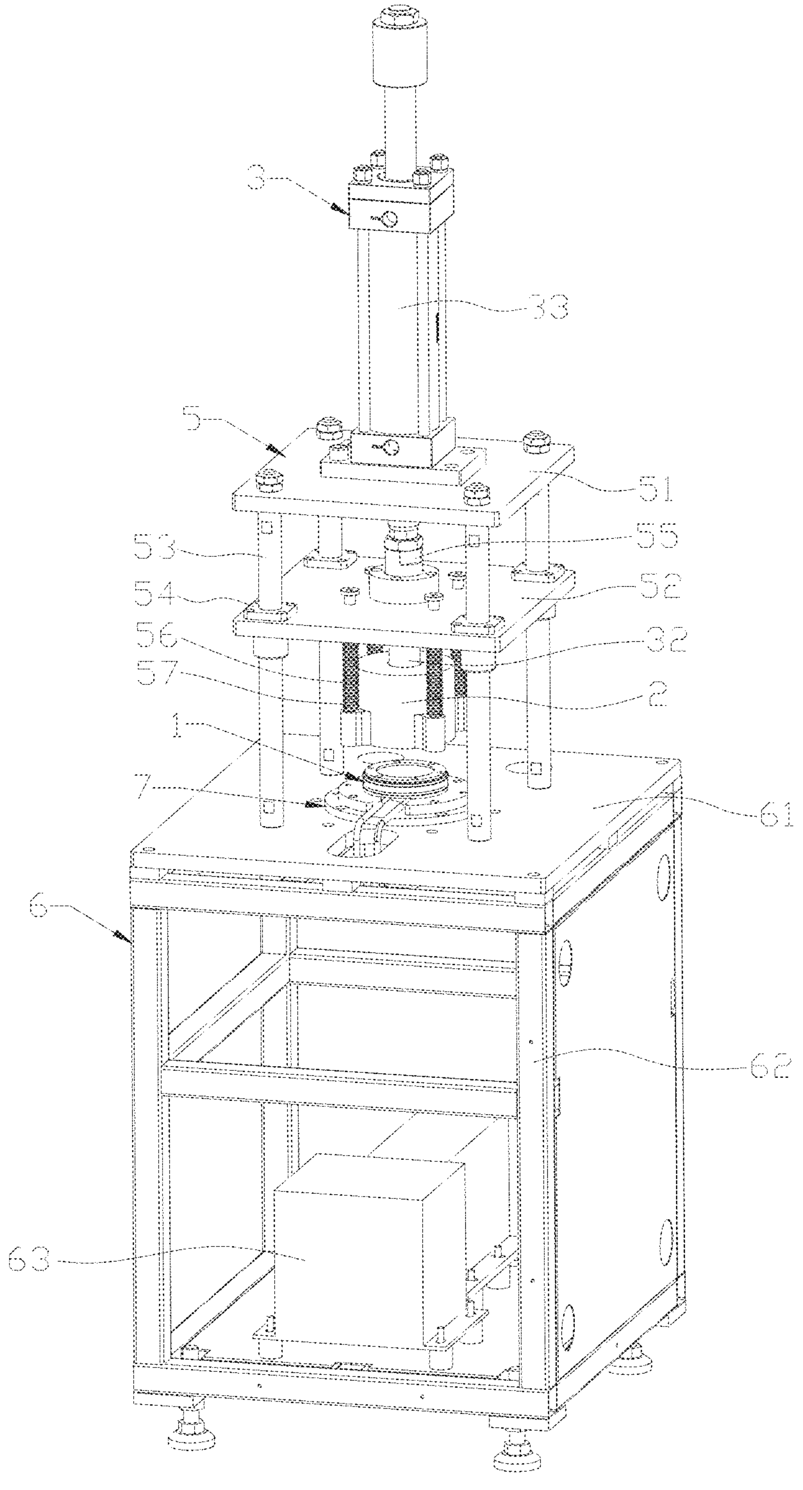
FIG. 1 is a schematic diagram of the three-dimensional structure of the pressure bonding device in an embodiment of the present invention.
Figure 2:
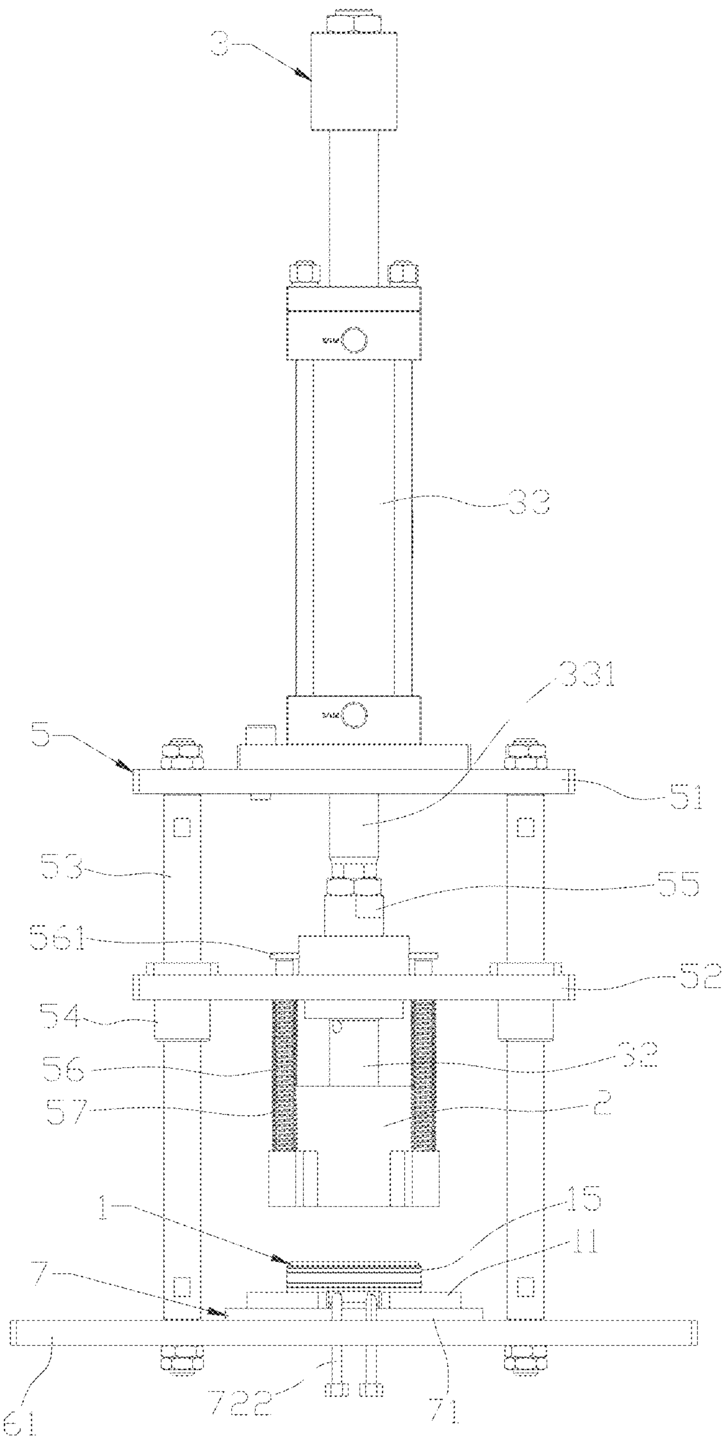
FIG. 2 is a front view of FIG. 1, with the load-bearing frame and the hydraulic pump being removed.
Figure 3:
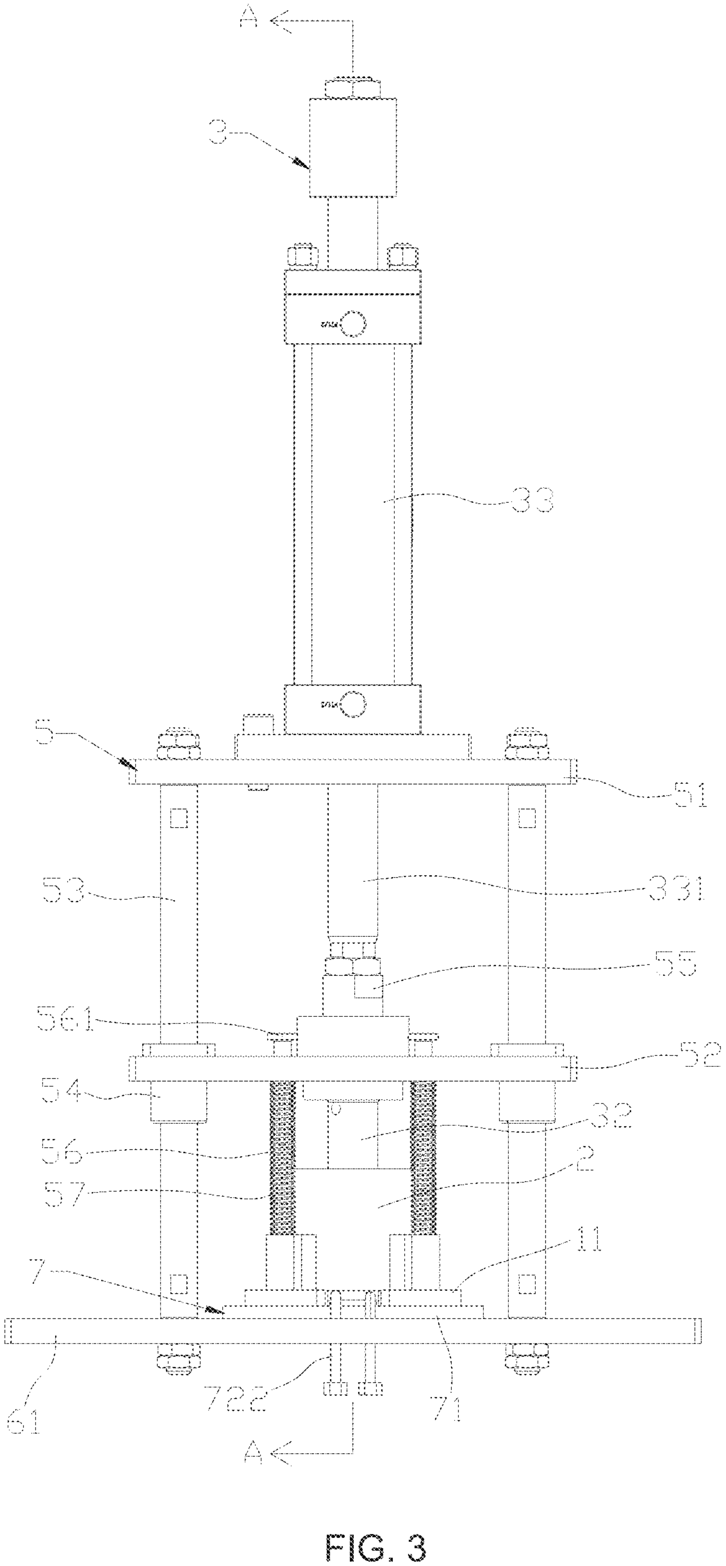
FIG. 3 is the front view when the pressure bonding device of FIG. 2 is in the pressing state.
Figure 4:
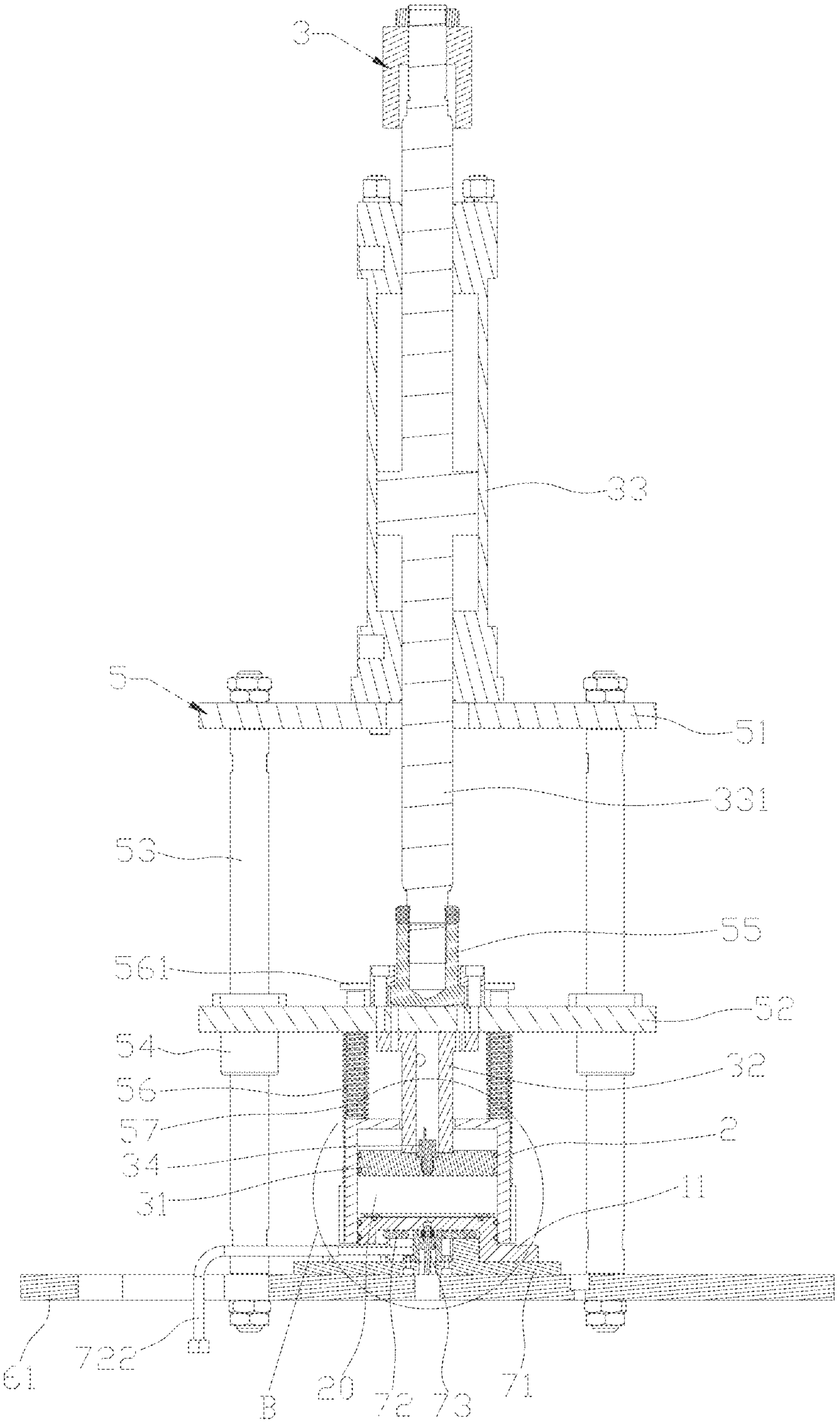
FIG. 4 is a schematic cross-sectional view taken along A-A line in FIG. 3.

In the figures: 1—base, 11—support seat, 110—exhaust hole, 111—bottom plate, 112 protrusion, 1121—installation surface, 1122—installation groove, 12—flexible sealing member, 13—annular limiting member, 14—second sealing ring, 15—third sealing ring, 16—groove, 17—notch, 2—sealing cover, 20—sealing space, 21—opening, 22—through hole, 3—pressurizing assembly, 31—piston, 311—first sealing ring, 312—vent hole, 32—piston rod, 321—hollow cavity, 33—driving device, 331—driving shaft, 34—pressure detection device, 4—flexible pressing member, 41—fluid bladder, 411—flexible casing, 412—fluid, 42—flexible film, 5—support frame, 51—support plate, 52—guide plate, 53—first guide shaft, 54—linear bearing, 55—floating joint, 56—second guide shaft, 561—limiting bulge, 57—elastic member, 6—worktable, 61—load-bearing plate, 62—load-bearing frame, 63—hydraulic pump, 7—heating assembly, 71—heat insulation member, 711—support platform, 712—pole, 7120—central hole, 72—heating member, 721—heating coil, 722—lead wire, 73—temperature detection device, 8—to-be-pressed member.

DETAILED DESCRIPTION OF THE EMBODIMENTS

The following will provide a further detailed description of the specific implementations of the present invention in conjunction with the accompanying drawings and embodiments. The following embodiments are used to illustrate the present invention, but are not intended to limit the scope of the present invention.

The terms “first”, “second”, “third”, “fourth”, etc. (if any) in the specification and claims of the present invention are only used to distinguish similar objects, and are not intended to be used to describe a specific sequence or order.

The terms “up”, “down”, “left”, “right”, “front”, “back”, “top”, “bottom” (if any) in the specification and claims of the present invention are defined based on the position of the structure in the figures and the position between the structures in the figures, only for the clarity and convenience of expressing the technical solution. It should be understood that the use of these directional words should not limit the scope of protection in the present invention.

As shown in FIGS. 1 to 11, the pressure bonding device provided in the embodiment of the present invention includes a base 1, a sealing cover 2, and a pressurizing assembly 3. The base 1 is used to place a to-be-pressed member 8. According to different application scenarios, the to-be-pressed member 8 can be lithium foil, electrode plate, electrode tab and other elements. The sealing cover 2 is located on one side of the base 1, and the sealing cover 2 is used to cooperate with the base 1 to form a sealing space 20 between the sealing cover 2 and the base 1 during pressure bonding operation.

The pressurizing assembly 3 is connected to the sealing cover 2, and the pressurizing assembly 3 is used to apply pressure to a flexible medium in the sealing space 20, so that the to-be-pressed member 8 is pressed under the pressure of the flexible medium.

The pressure bonding device provided in the embodiment of the present invention includes a base 1, a sealing cover 2, and a pressurizing assembly 3. During pressure bonding operation, the sealing cover 2 and the base 1 cooperate with each other to form a sealing space 20, and the pressurizing assembly 3 applies pressure to a flexible medium in the sealing space 20, thereby indirectly pressing the to-be-pressed member 8. Due to the ability of the flexible medium to uniformly apply pressure to various positions of the to-be-pressed member 8 (even if the surface of the to-be-pressed member 8 is not flat, the flexible medium can also uniformly apply pressure to various positions of the to-be-pressed member 8), compared to traditional flat hot pressing or rolling pressing methods, this method of using flexible medium to apply pressure to the to-be-pressed member 8 can ensure the uniformity of applying pressure, thereby improving the pressure bonding effect, and accordingly enhancing the performance of the battery.

As shown in FIG. 1 to FIG. 5, as one embodiment, the flexible medium includes gas (usually air) located in the sealing space 20. The pressurizing assembly 3 is used to pressurize the gas in the sealing space 20 to form high-pressure gas (usually high-pressure air) during pressure bonding operation, so as to apply pressure to the to-be-pressed member 8 through the high-pressure gas, thereby causing the to-be-pressed member 8 to be pressed under the pressure of the high-pressure gas (the pressure of the high-pressure gas can directly or indirectly act on the to-be-pressed member 8).

Figure 13:
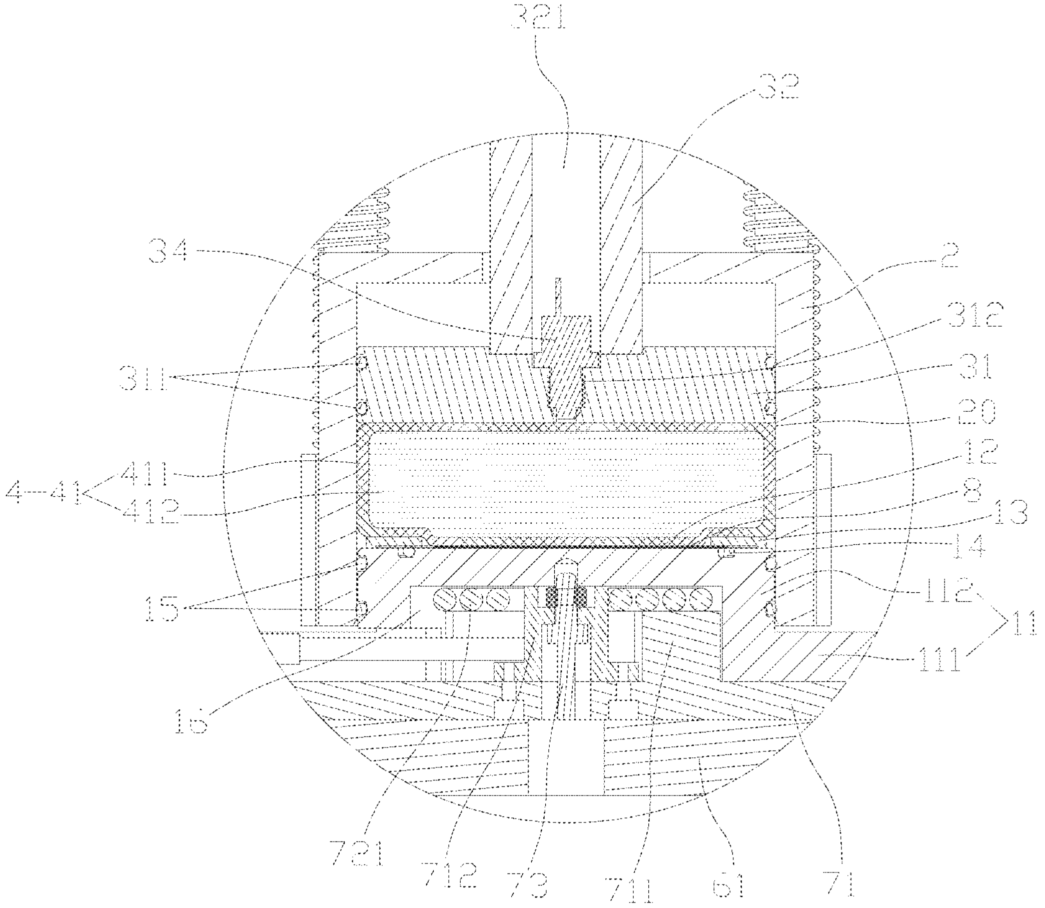
FIG. 13 is a partial cross-sectional schematic diagram of the pressure bonding device in another embodiment of the present invention.

As shown in FIG. 13, as another embodiment, the flexible medium includes a flexible pressing member 4, and the flexible pressing member 4 is provided in the sealing space 20; the pressurizing assembly 3 is used to compress the flexible pressing member 4, so as to apply pressure to the to-be-pressed member 8 through the flexible pressing member 4 (the flexible pressing member 4 can directly or indirectly apply pressure to the to-be-pressed member 8), so that the to-be-pressed member 8 is pressed under the pressure of the flexible pressing member 4. Due to the flexible material of the flexible pressing member 4, the shape of the flexible pressing member 4 can adaptively change according to the shape of the surface of the to-be-pressed member 8 during pressure bonding operation, so as to uniformly transfer the compressing force exerted by the pressurizing assembly 3 on the flexible pressing member 4 to various positions of the to-be-pressed member 8. As one embodiment, when the pressurizing assembly 3 compresses the flexible pressing member 4, the pressurizing assembly 3 can also pressurize the gas in the sealing space 20 to form high-pressure gas, and the pressure of the high-pressure gas in the sealing space 20 can further act on the flexible pressing member 4, so as to uniformly apply the pressure of the high-pressure gas to the to-be-pressed member 8 through the flexible pressing member 4 (i.e., the flexible medium includes both gas and the flexible pressing member 4).

As shown in FIG. 13, as one embodiment, the flexible pressing member 4 includes a fluid bladder 41, and the fluid bladder 41 can be a liquid bladder or an air bladder, etc. Specifically, the fluid bladder 41 includes a flexible casing 411 and a fluid 412 provided inside the flexible casing 411, and the fluid 412 can be liquid or gas, etc. When the pressurizing assembly 3 compresses the fluid bladder 41, the shape of the fluid bladder 41 can adaptively change according to the shape of the surface of the to-be-pressed member 8, so as to uniformly transfer the pressure exerted by the pressurizing assembly 3 on the fluid bladder 41 to various positions of the to-be-pressed member 8.

Figure 14:
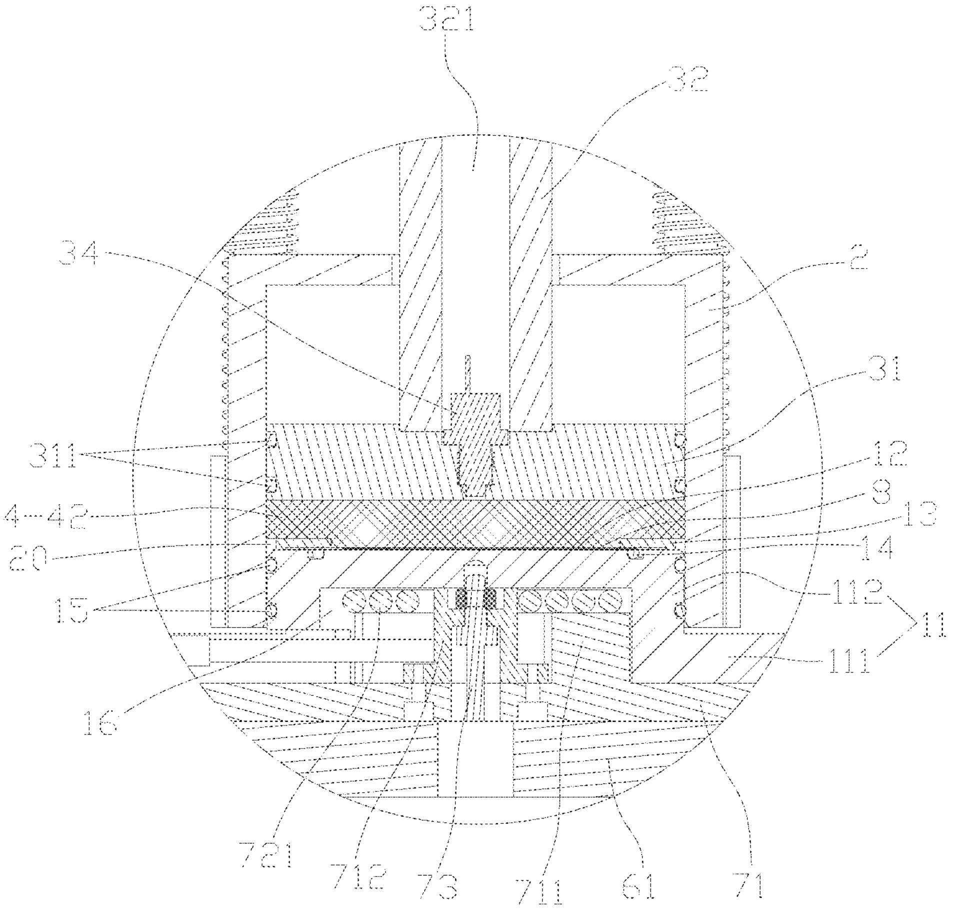
FIG. 14 is a partial cross-sectional schematic diagram of the pressure bonding device in another embodiment of the present invention.

As shown in FIG. 14, as another embodiment, the flexible pressing member 4 includes a flexible film 42, and the flexible film 42 can be made of materials such as silicone, thermoplastic elastomer, etc. When the pressurizing assembly 3 compresses the flexible film 42, the shape of the flexible film 42 can adaptively change according to the shape of the surface of the to-be-pressed member 8, so as to uniformly transfer the compressing force exerted by the pressurizing assembly 3 on the flexible film 42 to various positions of the to-be-pressed member 8.

As shown in FIGS. 4 to 8, as one embodiment, the pressurizing assembly 3 includes a piston 31, and the piston 31 is located within the sealing cover 2 and is slidably sealed with the inner wall of the sealing cover 2 (specifically, the outer peripheral surface of the piston 31 is slidably sealed with the inner wall of the sealing cover 2). The piston 31 can move towards or away from the base 1 within the sealing cover 2. During pressure bonding operation, the sealing space 20 is formed between the sealing cover 2, the piston 31, and the base 1. The piston 31 can apply pressure to the flexible medium in the sealing space 20 when moving towards the base 1. Specifically, in this embodiment, the piston 31 can compress the gas in the sealing space 20 when moving towards the base 1, so that the gas in the sealing space 20 is compressed into high-pressure gas.

Of course, in other embodiments, the pressurizing assembly 3 can also apply pressure to the flexible medium in the sealing space 20 through other means. For example, the pressurizing assembly 3 includes an air compressor (not shown), and the air compressor is connected to the sealing cover 2. The air compressor is used to compress the air and deliver the compressed high-pressure air into the sealing cover 2, thereby pressurizing the flexible medium in the sealing space 20.

As shown in FIG. 13, as another embodiment, the flexible medium includes a flexible pressing member 4, and the flexible pressing member 4 is provided in the sealing space 20; when moving towards the base 1, the piston 31 can compress the flexible pressing member 4 to apply pressure to the to-be-pressed member 8 through the flexible pressing member 4 (i.e., the piston 31 directly contacts the flexible pressing member 4 to apply compressing force to the flexible pressing member 4, and the flexible pressing member 4 then uniformly transfers the compression force exerted by the piston 31 to the to-be-pressed member 8).

As shown in FIGS. 4 to 8, as one embodiment, a first sealing ring 311 is provided on the outer peripheral surface of the piston 31, and the first sealing ring 311 is sandwiched between the outer peripheral surface of the piston 31 and the inner wall of the sealing cover 2, thereby ensuring the sealing between the piston 31 and the sealing cover 2, and facilitating the compression of the gas in the sealing space 20 by the piston 31.

As shown in FIGS. 4 to 8, as one embodiment, there are multiple (illustrated as two) first sealing rings 311, and the multiple first sealing rings 311 are spaced along the axial direction of the piston 31 to improve the sealing effect.

As shown in FIGS. 1 to 8, as one embodiment, the pressurizing assembly 3 further includes a piston rod 32 and a driving device 33. The driving device 33 is located outside the sealing cover 2, one end of the piston rod 32 is connected to the driving device 33, and the other end of the piston rod 32 passes through the sealing cover 2 and is connected to the piston 31; the driving device 33 is used to drive the piston 31 to move towards or away from the base 1 within the sealing cover 2. During pressure bonding operation, the driving device 33 drives the piston 31 to extend in a direction towards the base 1, thus pressurizing the gas in the sealing space 20; after the pressure bonding operation is completed, the driving device 33 drives the piston 31 to retract in a direction away from the base 1, thus preparing for the next pressure bonding operation.

Specifically, in this embodiment, the pressurizing assembly 3 and the sealing cover 2 are both located directly above the base 1. The driving device 33, the piston rod 32 and the sealing cover 2 are arranged in sequence from top to bottom. The top end of the piston rod 32 is connected to the driving device 33, the top of the sealing cover 2 is provided with a through hole 22, and the bottom end of the piston rod 32 passes through the through hole 22 of the sealing cover 2 and is then connected to the piston 31; the driving device 33 is used to drive the piston 31 to move up or down within the sealing cover 2.

As shown in FIGS. 4 to 8, as one embodiment, a hollow cavity 321 communicated with the sealing space 20 is provided inside the piston rod 32. A pressure detection device 34 is provided in the hollow cavity 321, and the pressure detection device 34 is used to detect the pressure in the sealing space 20 (in this embodiment, the pressure detection device 34 is used to detect the air pressure in the sealing space 20), so as to control the movement distance of the piston 31 based on the pressure value detected by the pressure detection device 34. This setting can facilitate the installation of the pressure detection device 34.

As shown in FIGS. 4 to 8, as one embodiment, a vent hole 312 is provided on the piston 31 at the position corresponding to the hollow cavity 321. The hollow cavity 321 is communicated with the sealing space 20 through the vent hole 312. A part of the pressure detection device 34 is located in the hollow cavity 321, and another part of the pressure detection device 34 is located in the vent hole 312, and the pressure detection device 34 seals (i.e., blocks) the vent hole 312, so as to prevent the gas in the sealing space 20 from leakage (specifically, the pressure detection device 34 is fixed in the vent hole 312 through thread provided on its outer peripheral surface). Of course, in other embodiments, the pressure detection device 34 may also be entirely located in the hollow cavity 321.

As shown in FIGS. 1 to 8, as one embodiment, the pressure bonding device further includes a support frame 5. The support frame 5 includes a support plate 51, a guide plate 52, and several first guide shafts 53. The driving device 33 is fixed on the support plate 51. The guide plate 52 is located between the support plate 51 and the sealing cover 2. One end of each first guide shaft 53 is fixedly connected to the support plate 51, and the guide plate 52 is slidably connected to each first guide shaft 53. The driving device 33 is connected to the guide plate 52, and one end of the piston rod 32 is connected to the guide plate 52; the driving device 33 is used to drive the guide plate 52 to move along the axial direction of the first guide shaft 53, thereby driving the piston rod 32 and the piston 31 to move along the axial direction of the first guide shaft 53.

The pressure bonding device further includes a worktable 6. The base 1 is arranged on the worktable 6, and the worktable 6 plays a load-bearing role. The other end of each first guide shaft 53 is fixedly connected to the worktable 6.

Specifically, in this embodiment, the worktable 6 includes a load-bearing frame 62 and a load-bearing plate 61 provided on the load-bearing frame 62, and the base 1 is provided on the load-bearing plate 61. The support plate 51 and the sealing cover 2 are located on the upper and lower sides of the guide plate 52, respectively. Each first guide shaft 53 extends vertically, the top end of each first guide shaft 53 is fixedly connected to the support plate 51, and the bottom of each first guide shaft 53 passes through the guide plate 52 and is fixedly connected to the load-bearing plate 61. The top end of the piston rod 32 is connected to the lower surface of the guide plate 52, and the driving shaft 331 of the driving device 33 is connected to the upper surface of the guide plate 52. The driving device 33 is used to drive the guide plate 52 to move up or down relative to the first guide shafts 53, thereby driving the piston rod 32 and the piston 31 to move up or down. Specifically, the first guide shafts 53 can play a guiding role to ensure that the positions of the guide plate 52, the piston rod 32 and the piston 31 do not deviate when they move up or down, thereby ensuring the smooth movement of the guide plate 52, the piston rod 32 and the piston 31; meanwhile, the first guide shafts 53 can provide support for the support frame 5 and the pressurizing assembly 3.

Specifically, in this embodiment, the load-bearing plate 61 is fixed on the load-bearing frame 62 by bolts. The top end of the first guide shaft 53 is fixed to the support plate 51 by a nut, and the bottom end of the first guide shaft 53 is fixed to the load-bearing plate 61 by a nut. The driving device 33 is fixed in the middle position of the support plate 51 by bolts. The top end of the piston rod 32 is connected to the guide plate 52 by bolts.

As shown in FIGS. 1 to 4, as one embodiment, there are multiple first guide shafts 53, and the multiple first guide shafts 53 are arranged at intervals along the circumferential direction of the guide plate 52. By providing multiple first guide shafts 53, the smooth movement of the guide plate 52, the piston rod 32 and the piston 31, and the support stability of the support frame 5 and the pressurizing assembly 3 are further ensured.

As shown in FIGS. 1 to 4, as one embodiment, both the support plate 51 and the guide plate 52 are rectangular structures, and there are four first guide shafts 53. The four first guide shafts 53 respectively correspond to the four corner positions of the support plate 51 and the four corner positions of the guide plate 52.

As shown in FIGS. 1 to 4, as one embodiment, several linear bearings 54 are provided on the guide plate 52. The linear bearings 54 are respectively sleeved on the first guide shafts 53 (i.e., the first guide shafts 53 pass through the linear bearings 54), and the linear bearings 54 can slide along the first guide shafts 53. By providing the linear bearings 54, the smoothness and stability of the guide plate 52 during its movement is improved, and the motion wear caused by direct contact between the first guide shafts 53 and the guide plate 52 is also reduced.

Specifically, in this embodiment, there are four linear bearings 54. The four linear bearings 54 are respectively sleeved on the four first guide shafts 53. The linear bearing 54 is fixed to the guide plate 52 by bolts.

As shown in FIGS. 1 to 4, as one embodiment, the driving device 33 is connected to the guide plate 52 through a floating joint 55. The floating joint 55 can absorb and reduce the eccentricity and deflection angle between the driving device 33 and the guide plate 52, reduce the relative accuracy requirements between the driving device 33 and the guide plate 52, and enable the driving device 33 and the guide plate 52 to operate smoothly within the allowable eccentricity range.

Specifically, in this embodiment, the driving shaft 331 of the driving device 33, the piston rod 32 and the piston 31 are coaxially arranged. The driving shaft 331 of the driving device 33 is connected to the guide plate 52 through the floating joint 55. The driving shaft 331 of the driving device 33 is connected to the floating joint 55 through a head with thread, and the floating joint 55 is fixedly connected to the guide plate 52 through bolts.

As shown in FIG. 1, as one embodiment, the driving device 33 is a hydraulic cylinder; a hydraulic pump 63 is provided inside the load-bearing frame 62, and the hydraulic pump 63 is connected to the driving device 33 to provide hydraulic driving force for the driving device 33. Of course, in other embodiments, the driving device 33 can also be other linear motion mechanisms, such as air cylinder, electric cylinder, etc.

Specifically, in this embodiment, the hydraulic pump 63 is fixed at the bottom of the load-bearing frame 62 through shock absorbers and adapted nuts, and the remaining electrical control components are installed on an electrical board on one side of the load-bearing frame 62.

As shown in FIGS. 1 to 4, as one embodiment, the driving device 33 is also connected to the sealing cover 2. The driving device 33 is also used to drive the sealing cover 2 to move towards or away from the base 1 (specifically, the driving device 33 is used to drive the sealing cover 2 to move up or down). During pressure bonding operation, the driving device 33 drives the sealing cover 2 to extend in a direction towards the base 1, so that the sealing cover 2 and the base 1 cooperate with each other to form a sealing space 20 between them; after the pressure bonding operation is completed, the driving device 33 drives the sealing cover 2 to retract in a direction away from the base 1, making it easier to remove the to-be-pressed member 8 from the base 1 and prepare for the next pressure bonding operation.

As shown in FIGS. 1 to 4, as one embodiment, the support frame 5 further includes several second guide shafts 56. One end of each second guide shaft 56 is fixedly connected to the sealing cover 2, and the other end of each second guide shaft 56 is slidably connected to the guide plate 52. Each second guide shaft 56 is sleeved with an elastic member 57, and two opposite ends of the elastic member 57 respectively abut against the guide plate 52 and the sealing cover 2. The elastic member 57 is used to apply pressure to the sealing cover 2 during pressure bonding operation so that the sealing cover 2 is in close contact with the base 1, and to drive the sealing cover 2 to reset after the pressure bonding operation is completed.

Specifically, in this embodiment, the second guide shaft 56 extends vertically, the bottom end of the second guide shaft 56 is fixedly connected to the sealing cover 2 through its own thread, and the top end of the second guide shaft 56 passes through the guide plate 52 to achieve sliding connection between the second guide shaft 56 and the guide plate 52; the top end of the second guide shaft 56 is provided with a limiting bulge 561, and the limiting bulge 561 can come into contact with the guide plate 52 to prevent the second guide shaft 56 from detaching from the guide plate 52. The elastic member 57 is a spring, and the spring is sleeved on the second guide shaft 56. The two ends of the spring respectively abut against the guide plate 52 and the sealing cover 2.

When the driving device 33 drives the guide plate 52 to move downward, the guide plate 52, the sealing cover 2 and the piston rod 32 move downward for a distance, and the sealing cover 2 comes into contact with the base 1. The driving device 33 continues to drive the guide plate 52 to move downward, and at this time, the elastic member 57 is compressed, and the elastic member 57 applies elastic force to the sealing cover 2, making the sealing cover 2 closely contact with the base 1 to ensure the tightness of the sealing space 20. Meanwhile, the piston rod 32 and the piston 31 continue to move downward, thereby compressing the gas in the sealing space 20 for pressure bonding operation. After the pressure bonding operation is completed, the driving device 33 drives the guide plate 52 to move upward, the guide plate 52, the piston rod 32 and the piston 31 retract upward, and the sealing cover 2 is reset during the rebound process of the elastic member 57 (i.e., the piston 31 moves upward within the sealing cover 2, while the sealing cover 2 does not move under the elastic force of the elastic member 57); the driving device 33 continues to drive the guide plate 52 to move upwards, and the sealing cover 2 retracts upwards along with the guide plate 52, the piston rod 32 and the piston 31, thus preparing for the next pressure bonding operation.

As shown in FIGS. 1 to 4, as one embodiment, there are multiple second guide shafts 56, and the multiple second guide shafts 56 are arranged at intervals along the circumferential direction of the sealing cover 2, thereby improving the movement stability of the sealing cover 2.

Specifically, in this embodiment, there are four second guide shafts 56, and the four second guide shafts 56 are uniformly arranged at intervals along the circumferential direction of the sealing cover 2. Each second guide shaft 56 is sleeved with an elastic member 57.

As shown in FIGS. 4 to 12, as one embodiment, the base 1 includes a support seat 11 for placing the to-be-pressed member 8, and an opening 21 is provided on one end of the sealing cover 2 nearing the support seat 11 (specifically, the opening 21 is provided at the bottom end of the sealing cover 2). During pressure bonding operation, the open end of the sealing cover 2 (i.e. the end of the sealing cover 2 with the opening 21) abuts against the support seat 11, and the sealing cover 2 covers the to-be-pressed member 8 on the support seat 11. The sealing space 20 is formed between the sealing cover 2 and the support seat 11 (specifically, the sealing space 20 is formed between the sealing cover 2, the piston 31, and the support seat 11).

As shown in FIGS. 9 to 12, as one embodiment, the support seat 11 is provided with several exhaust holes 110. The exhaust holes 110 penetrate the support seat 11 (specifically, the exhaust holes 110 vertically penetrate the support seat 11), and the exhaust holes 110 are communicated to the outside. During pressure bonding operation, the to-be-pressed member 8 covers the exhaust holes 110, and the gas between the to-be-pressed member 8 and the support seat 11 can be discharged through the exhaust holes 110.

Specifically, due to the possibility of air between the to-be-pressed member 8 and the support seat 11 when the to-be-pressed member 8 is placed on the support seat 11, by providing the exhaust holes 110 on the support seat 11, the air between the to-be-pressed member 8 and the support seat 11 can be discharged through the exhaust holes 110 during pressure bonding operation, so that the to-be-pressed member 8 is completely in contact with the support seat 11, thereby improving the uniformity of pressure bonding (if the air between the to-be-pressed member 8 and the support seat 11 is not discharged, this part of the air will compress the to-be-pressed member 8 during pressure bonding operation, which may cause bulging and other phenomena to the to-be-pressed member 8, affecting the uniformity of pressing of the to-be-pressed member 8).

As shown in FIGS. 9 to 12, as one embodiment, there are multiple exhaust holes 110, and the multiple exhaust holes 110 are uniformly spaced on the support seat 11. By providing multiple exhaust holes 110, the diameter of each exhaust hole 110 can be set to be small, thereby avoiding the to-be-pressed member 8 from sinking into the exhaust hole 110 during pressure bonding operation and affecting the flatness of the to-be-pressed member 8 (if the diameter of the exhaust hole 110 is too large, the to-be-pressed member 8 may sink into the exhaust hole 110 under pressure, causing defects such as dents on the to-be-pressed member 8).

As one embodiment, the diameter of the exhaust hole 110 is 0.2 mm~0.5 mm.

As shown in FIGS. 4 to 6 and FIGS. 9 to 11, as one embodiment, the base 1 further includes a flexible sealing member 12, and the flexible sealing member 12 is covered on the support seat 11. The flexible sealing member 12 covers the to-be-pressed member 8 and the exhaust holes 110, that is, the to-be-pressed member 8 is located between the flexible sealing member 12 and the support seat 11.

Specifically, by providing the flexible sealing member 12, the flexible sealing member 12 covers the to-be-pressed member 8 and the exhaust holes 110. On the one hand, the flexible sealing member 12 can prevent gas in the sealing space 20 from entering between the to-be-pressed member 8 and the support seat 11, and meanwhile, the flexible sealing member 12 can seal the exhaust holes 110 to prevent gas in the sealing space 20 from being discharged through the exhaust holes 110, so that a high-pressure environment can be formed in the sealing space 20; on the other hand, due to the flexible material of the flexible sealing member 12, high-pressure gas acts on the flexible sealing member 12 during pressure bonding operation, and the shape of the flexible sealing member 12 can adaptively change according to the shape of the surface of the to-be-pressed member 8, thereby uniformly transferring the pressure exerted by the high-pressure gas on the flexible sealing member 12 to various positions of the to-be-pressed member 8, thus improving the uniformity of pressure bonding. The flexible sealing member 12 can be made of materials such as silicone, thermoplastic elastomers, etc.

As shown in FIGS. 4 to 6 and FIGS. 9 to 11, as one embodiment, the base 1 further includes an annular limiting member 13. The annular limiting member 13 is a ring-shaped structure. The annular limiting member 13 is covered at the edge portion of the flexible sealing member 12 (the part of the flexible sealing member 12 covering the to-be-pressed member 8 is not covered by the annular limiting member 13), and the annular limiting member 13 is fixedly connected to the support seat 11, that is, the edge portion of the flexible sealing member 12 is sandwiched between the annular limiting member 13 and the support seat 11.

Specifically, by providing the annular limiting member 13, the annular limiting member 13 can tightly press and fix the edge portion of the flexible sealing member 12 on the support seat 11, thereby preventing gas in the sealing space 20 from entering between the to-be-pressed member 8 and the support seat 11 through the gap between the edge portion of the flexible sealing member 12 and the support seat 11. The annular limiting member 13 is fixedly connected to the support seat 11 through bolts. In this embodiment, the flexible sealing member 12 is a circular plate structure, the shape of the annular limiting member 13 is adapted to the shape of the flexible sealing member 12, and the annular limiting member 13 is an annular structure. Of course, in other embodiments, the flexible sealing member 12 can also be a rectangular, polygonal, or other structure, and the annular limiting member 13 can also be a rectangular annular, polygonal annular structure, or the like (the annular limiting member 13 can even be formed by enclosing multiple strip-shaped members).

As shown in FIGS. 4 to 6 and FIGS. 9 to 11, as one embodiment, a second sealing ring 14 is provided on the top surface of the support seat 11. The second sealing ring 14 is arranged around the periphery of the to-be-pressed member 8. The flexible sealing member 12 covers the second sealing ring 14, that is, the second sealing ring 14 is located between the flexible sealing member 12 and the support seat 11. By providing the second sealing ring 14, the second sealing ring 14 can further seal the flexible sealing member 12 and the support seat 11, thereby further preventing gas in the sealing space 20 from entering between the to-be-pressed member 8 and the support seat 11 through the gap between the edge portion of the flexible sealing member 12 and the support seat 11.

Figure 5:
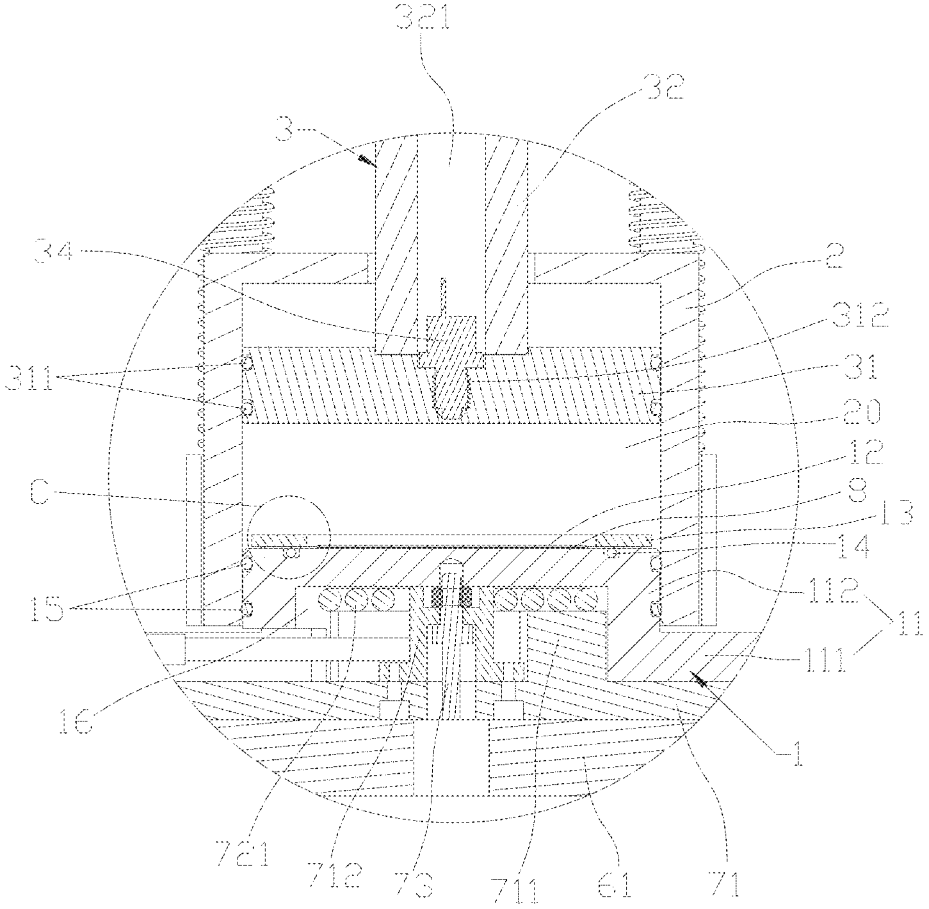
FIG. 5 is a partially enlarged schematic diagram of position B in FIG. 4.
Figure 6:
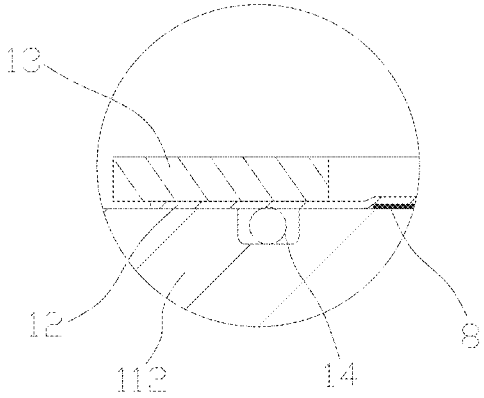
FIG. 6 is a partially enlarged schematic diagram of position C in FIG. 5.
Figure 7:
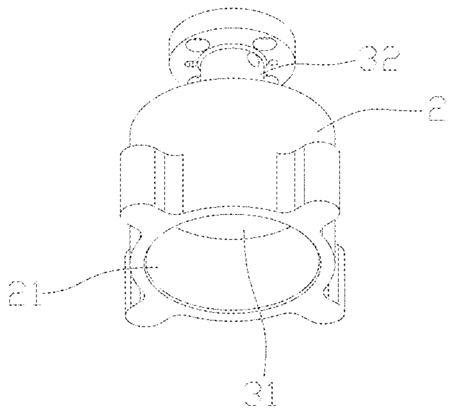
FIG. 7 is a schematic diagram of the assembly relationship between the piston, the piston rod and the sealing cover in the embodiment of the present invention.
Figure 8:
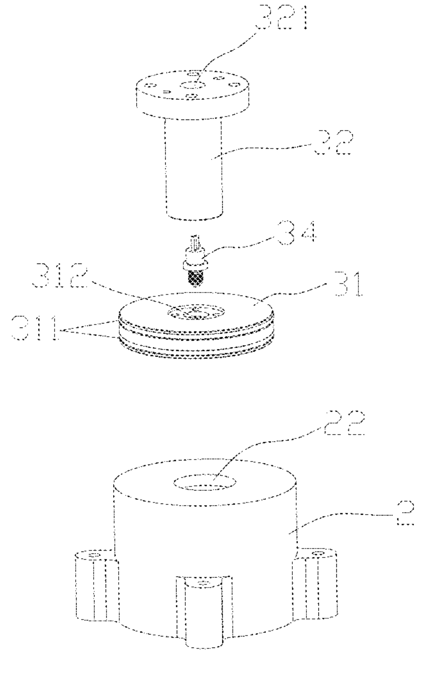
FIG. 8 is a schematic diagram of the explosion structure in FIG. 7.

As shown in FIGS. 5 and 6, as one embodiment, the second sealing ring 14 is arranged corresponding to the annular limiting member 13, that is, the second sealing ring 14 is sandwiched between the support seat 11 and the annular limiting member 13, and the annular limiting member 13 can compress the second sealing ring 14, so that the second sealing ring 14 can provide better sealing effect.

As shown in FIGS. 4 to 6 and FIGS. 9 to 12, as one embodiment, the support seat 11 includes a bottom plate 111 and a protrusion 112 connected to the bottom plate 111 (in this embodiment, the protrusion 112 and the bottom plate 111 are an integral structure). The protrusion 112 protrudes towards the sealing cover 2 (i.e., the protrusion 112 protrudes upward relative to the bottom plate 111). The protrusion 112 is used to place the to-be-pressed member 8. The exhaust holes 110 are provided on the protrusion 112, and the exhaust holes 110 penetrate the protrusion 112 (specifically, the exhaust holes 110 penetrate the protrusion 112 vertically). During pressure bonding operation, the sealing cover 2 covers the protrusion 112, and the open end of the sealing cover 2 abuts against the bottom plate 111. The sealing space 20 is formed between the sealing cover 2 and the protrusion 112 (specifically, the sealing space 20 is formed between the sealing cover 2, the piston 31, and the protrusion 112).

Figure 11:
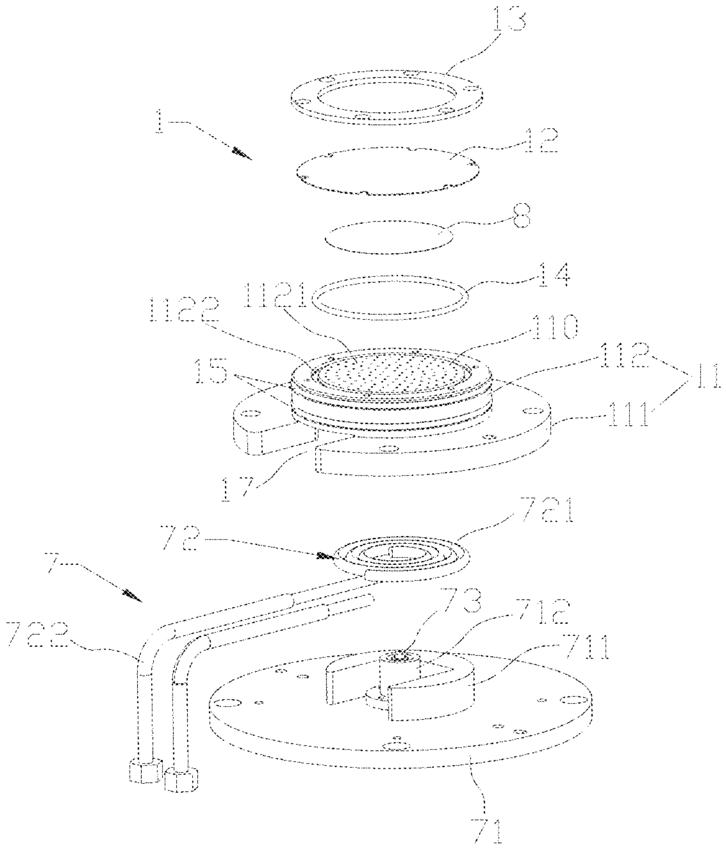
FIG. 11 is a schematic diagram of the explosion structure in FIG. 9.
Figure 12:
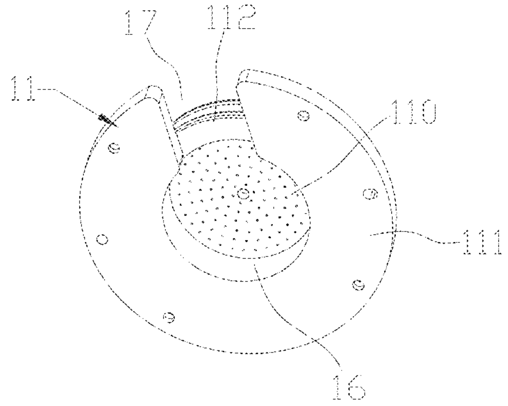
FIG. 12 is a bottom view of the support seat in the embodiment of the present invention.

As shown in FIG. 11, as one embodiment, the top surface of the protrusion 112 is provided with an installation surface 1121, and the installation surface 1121 is located in the middle of the top surface of the protrusion 112. The installation surface 1121 is used to place the to-be-pressed member 8, and the exhaust holes 110 are arranged corresponding to the installation surface 1121. The flexible sealing member 12 covers the installation surface 1121.

As shown in FIG. 11, as one embodiment, the top surface of the protrusion 112 is provided with an installation groove 1122, and the installation groove 1122 is arranged around the periphery of the installation surface 1121. The installation groove 1122 is located between the installation surface 1121 and the edge of the protrusion 112, and the second sealing ring 14 is arranged inside the installation groove 1122; the flexible sealing member 12 covers the installation groove 1122, and the edge portion of the flexible sealing member 12 is located between the installation groove 1122 and the edge of the protrusion 112.

As shown in FIGS. 4, 5, and 9 to 11, as one embodiment, the sealing cover 2 is a cylindrical structure, and the protrusion 112 is a cylindrical structure that matches with the sealing cover 2.

As shown in FIGS. 4, 5, and 9 to 11, as one embodiment, a third sealing ring 15 is provided on the outer peripheral surface of the protrusion 112. During pressure bonding operation, the third sealing ring 15 is sandwiched between the outer peripheral surface of the protrusion 112 and the inner wall of the sealing cover 2, thereby preventing gas in the sealing space 20 from being discharged from the gap between the outer peripheral surface of the protrusion 112 and the inner wall of the sealing cover 2.

As shown in FIGS. 4, 5, and 9 to 11, as one embodiment, there are multiple (illustrated as two) third sealing rings 15, and the multiple third sealing rings 15 are arranged at intervals along the axial direction of the protrusion 112 to achieve better sealing effect.

Figure 9:
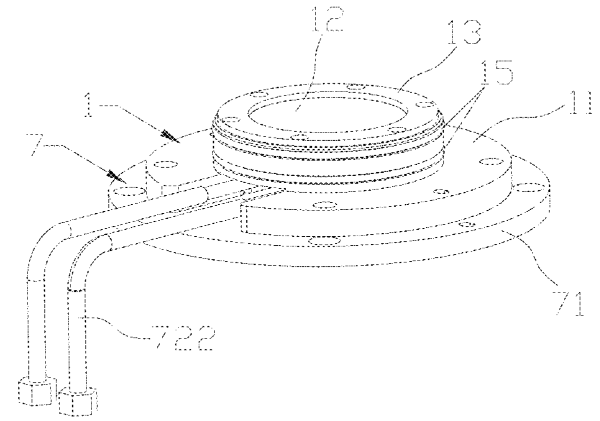
FIG. 9 is a schematic diagram of the assembly relationship between the base and the heating assembly in the embodiment of the present invention.

As shown in FIGS. 9 and 11, as one embodiment, the pressure bonding device further includes a heating assembly 7, and the heating assembly 7 is used for heating the base 1 (specifically heating the support seat 11), so as to heat the to-be-pressed member 8 at a preset temperature.

As shown in FIGS. 4, 5, and 9 to 11, as one embodiment, the heating assembly 7 includes a heat insulation member 71 and a heating member 72. The heat insulation member 71 is disposed below the base 1, and the heating member 72 is disposed between the heat insulation member 71 and the base 1. Specifically, in this embodiment, the heat insulation member 71 is installed on the load-bearing plate 61, and the base 1 is disposed on the heat insulation member 71.

As shown in FIGS. 9 to 12, as one embodiment, the bottom wall of the base 1 is provided with a groove 16, and the heating member 72 is arranged in the groove 16. The heat insulation member 71 is provided with a support platform 711, and the support platform 711 protrudes from the heat insulation member 71 towards the base 1 (i.e., the support platform 711 protrudes upward from the heat insulation member 71), and the support platform 711 extends into the groove 16; the heating member 72 is placed on the support platform 711, and the heating member 72 is in contact with the base 1, thereby better heating the base 1. Meanwhile, the size of the support platform 711 matches the size of the groove 16, thereby limiting the position of the base 1 and facilitating the positioning and assembly of the base 1 and the heat insulation member 71.

As shown in FIGS. 9 to 12, as one embodiment, a pole 712 is provided on the heat insulation member 71, and the pole 712 protrudes from the heat insulation member 71 towards the base 1 (i.e., the pole 712 protrudes upward from the heat insulation member 71), and the pole 712 extends into the groove 16. The pole 712 is located within the support platform 711. The heating member 72 includes a heating coil 721. The heating coil 721 is located in the groove 16, the heating coil 721 is placed on the support platform 711, and the heating coil 721 is sleeved on the pole 712 to limit and fix the heating coil 721.

Figure 10:
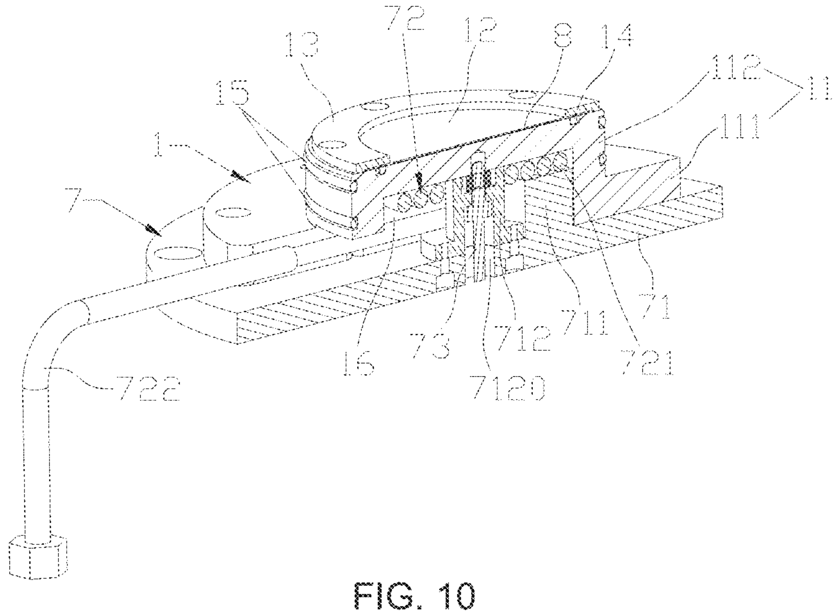
FIG. 10 is a schematic cross-sectional view of FIG. 9.

As shown in FIGS. 9 to 11, as one embodiment, the heating member 72 further includes lead wires 722. One side of the base 1 is provided with a notch 17. One end of the lead wire 722 is connected to the heating coil 721, and the other end of the lead wire 722 extends outside the base 1 through the notch 17 and is connected to a power supply device (not shown).

As shown in FIGS. 4, 5, and 9 to 11, as one embodiment, a temperature detection device 73 is installed inside the pole 712, and the temperature detection device 73 is in contact with the base 1. The temperature detection device 73 is used to detect the heating temperature of the base 1, thereby facilitating the control of the heating temperature of the heating member 72.

Specifically, the pole 712 is provided with a central hole 7120, and the temperature detection device 73 is arranged in the central hole 7120. The temperature detection device 73 is fixed to the pole 712 through a nut.

The working principle of the pressure bonding device in this embodiment is as follows:

(1) In the normal state (i.e. non-pressing state), the driving shaft 331 of the driving device 33 retracts upwards, the guide plate 52 and the sealing cover 2 are located above the base 1, the sealing cover 2 is ejected downwards under the action of the elastic member 57, and the piston 31 is located at the uppermost position within the sealing cover 2. The staff places the to-be-pressed member 8 on the support seat 11, and then places the flexible sealing member 12 on the support seat 11, so that the flexible sealing member 12 completely covers the to-be-pressed member 8. Then, the annular limiting member 13 is covered on the flexible sealing member 12, and the annular limiting member 13 is fixed to the support seat 11 through bolts, thereby ensuring that the gas in the sealing space 20 does not leak during pressure bonding operation. Then, the heating member 72 is turned on, and the heating member 72 is used to heat the base 1; after the temperature of the base 1 rises to the preset temperature, the initial preparation work is completed, and the pressure bonding operation can begin.

(2) During the process of pressure bonding, the entire pressure bonding operation is divided into two stages: the stage of tightly pressing the sealing cover 2 and the stage of compressing air. The driving device 33 drives the guide plate 52 to move downwards, and the sealing cover 2 moves downwards for a certain distance and comes into contact with and fully abuts against the base 1, whereby the stage of tightly pressing the sealing cover 2 is completed. The driving device 33 continues to drive the guide plate 52 to move downwards, the piston rod 32 and the piston 31 move downwards, compressing the air in the sealing space 20 to form high-pressure air (when there is a flexible pressing member 4 in the sealing space 20, the piston 31 also compresses the flexible pressing member 4), and the to-be-pressed member 8 is pressed under the pressure of the high-pressure gas (and/or the flexible pressing member 4). Meanwhile, during the stage of compressing air, as the guide plate 52 moves downward continuously, the elastic member 57 is continuously compressed, allowing the elastic member 57 to apply great elastic force to the sealing cover 2 to tightly press the sealing cover 2, thus avoiding air leakage between the sealing cover 2 and the base 1 due to excessive pressure in the sealing space 20.

After the pressure in the sealing space 20 reaches a preset pressure level, the pressure in the sealing space 20 is kept unchanged for applying pressure for a period of time to improve the pressure bonding effect. After the pressure bonding operation is completed, the driving device 33 drives the guide plate 52, the piston rod 32 and the sealing cover 2 to retract upwards, and the sealing cover 2 resets during the rebound process of the elastic member 57, thus preparing for the next pressure bonding operation.

The pressure bonding device provided in the embodiments of the present invention includes a base 1, a sealing cover 2, and a pressurizing assembly 3. During pressure bonding operation, the sealing cover 2 and the base 1 cooperate with each other to form a sealing space 20, and the pressurizing assembly 3 is used to apply pressure to a flexible medium in the sealing space 20, thereby indirectly pressing the to-be-pressed member 8. Due to the ability of the flexible medium to uniformly apply pressure to various positions of the to-be-pressed member 8, compared to traditional flat hot pressing or rolling pressing methods, this method of using the flexible medium to apply pressure to the to-be-pressed member 8 can ensure the uniformity of applying pressure, thus improving the pressure bonding effect and accordingly enhancing the performance of the battery.

The above are only the specific embodiments of the present invention, but the scope of protection of the present invention is not limited to this. Any technical personnel familiar with this technical field who can easily think of changes or replacements within the scope of technology disclosed in the present invention should be covered within the scope of protection of the present invention. Therefore, the protection scope of the present invention should be based on the protection scope of the claims.

The invention claimed is:

1. A pressure bonding device comprising a base, a sealing cover, and a pressurizing assembly, wherein the base is configured to place a to-be-pressed member; the sealing cover is configured to cooperate with the base to form a sealing space between the base and the sealing cover during pressure bonding operation; the pressurizing assembly is connected to the sealing cover, and the pressurizing assembly is configured to apply pressure to a flexible medium in the sealing space to cause the to-be-pressed member to be pressed under the pressure of the flexible medium;

wherein the pressurizing assembly comprises a piston, the piston is located within the sealing cover and is slidably sealed with an inner wall of the sealing cover, and the sealing space is formed between the sealing cover, the piston and the base; the piston can apply pressure to the flexible medium in the sealing space when moving towards the base;

wherein the pressurizing assembly further comprises a piston rod and a driving device, the driving device is located outside the sealing cover, one end of the piston rod is connected to the driving device, and the other end of the piston rod passes through the sealing cover and is connected to the piston; the driving device is configured to drive the piston to move towards or away from the base within the sealing cover;

wherein the pressure bonding device further comprises a support frame, the support frame comprises a support plate, a guide plate, and several first guide shafts, the driving device is fixed on the support plate; the guide plate is located between the support plate and the sealing cover, one end of each first guide shaft is fixedly connected to the support plate, the guide plate is slidably connected to each first guide shaft; the driving device is connected to the guide plate, and one end of the piston rod is connected to the guide plate; the driving device is configured to drive the guide plate to move along an axial direction of the first guide shaft.

2. The pressure bonding device as claimed in claim 1, wherein the flexible medium comprises gas located in the sealing space, and the pressurizing assembly is configured to pressurize the gas in the sealing space to form high-pressure gas to apply pressure to the to-be-pressed member through the high-pressure gas;

and/or, the flexible medium comprises a flexible pressing member provided in the sealing space, and the pressurizing assembly is configured to compress the flexible pressing member to apply pressure to the to-be-pressed member through the flexible pressing member.

3. The pressure bonding device as claimed in claim 2, wherein the flexible pressing member comprises a fluid bladder and/or a flexible film.

4. The pressure bonding device as claimed in claim 1, wherein the driving device is connected to the sealing cover, and the driving device is further configured to drive the sealing cover to move towards or away from the base.

5. The pressure bonding device as claimed in claim 1, wherein a hollow cavity communicated with the sealing space is provided inside the piston rod, and a pressure detection device is provided in the hollow cavity for detecting the pressure in the sealing space.

6. The pressure bonding device as claimed in claim 1, wherein the pressure bonding device further comprises a worktable, the base is arranged on the worktable;

the other end of each first guide shaft is fixedly connected to the worktable.

7. The pressure bonding device as claimed in claim 1, wherein several linear bearings are provided on the guide plate, and the linear bearings are respectively sleeved on the first guide shafts.

8. The pressure bonding device as claimed in claim 1, wherein the driving device is connected to the guide plate through a floating joint.

9. The pressure bonding device as claimed in claim 1, wherein the support frame further comprises several second guide shafts, one end of each second guide shaft is fixedly connected to the sealing cover, and the other end of each second guide shaft is slidably connected to the guide plate; each second guide shaft is sleeved with an elastic member, and two opposite ends of the elastic member respectively abut against the guide plate and the sealing cover.

10. A pressure bonding device comprising a base, a sealing cover, and a pressurizing assembly, wherein the base is configured to place a to-be-pressed member; the sealing cover is configured to cooperate with the base to form a sealing space between the base and the sealing cover during pressure bonding operation; the pressurizing assembly is connected to the sealing cover, and the pressurizing assembly is configured to apply pressure to a flexible medium in the sealing space to cause the to-be-pressed member to be pressed under the pressure of the flexible medium;

wherein the base comprises a support seat for placing the to-be-pressed member, and an opening is provided on one end of the sealing cover nearing the support seat; during pressure bonding operation, the open end of the sealing cover abuts against the support seat, and the sealing space is formed between the sealing cover and the support seat;

wherein the support seat is provided with several exhaust holes, and the exhaust holes penetrate the support seat; during pressure bonding operation, the gas between the to-be-pressed member and the support seat can be discharged through the exhaust holes.

11. The pressure bonding device as claimed in claim 10, wherein the base further comprises a flexible sealing member, the flexible sealing member is covered on the support seat, and the flexible sealing member covers the to-be-pressed member and the exhaust holes.

12. The pressure bonding device as claimed in claim 11, wherein the base further comprises an annular limiting member, the annular limiting member is covered at an edge portion of the flexible sealing member, and the annular limiting member is fixedly connected to the support seat.

13. The pressure bonding device as claimed in claim 11, wherein a second sealing ring is provided on a top surface of the support seat, the second sealing ring is arranged around a periphery of the to-be-pressed member, and the second sealing ring is located between the flexible sealing member and the support seat.

14. The pressure bonding device as claimed in claim 10, wherein the support seat comprises a bottom plate and a protrusion connected to the bottom plate, the protrusion protrudes towards the sealing cover, the protrusion is configured to place the to-be-pressed member, the exhaust holes are provided on the protrusion; during pressure bonding operation, the sealing cover covers the protrusion, the open end of the sealing cover abuts against the bottom plate, and the sealing space is formed between the sealing cover and the protrusion.

15. The pressure bonding device as claimed in claim 14, wherein a third sealing ring is provided on an outer peripheral surface of the protrusion, and the third sealing ring is sandwiched between the outer peripheral surface of the protrusion and an inner wall of the sealing cover.

16. The pressure bonding device as claimed in claim 1, wherein the pressure bonding device further comprises a heating assembly for heating the base.

17. The pressure bonding device as claimed in claim 10, wherein the pressure bonding device further comprises a heating assembly for heating the base.

* * * * *